Patented Dec. 15, 1931                                                     1,836,447

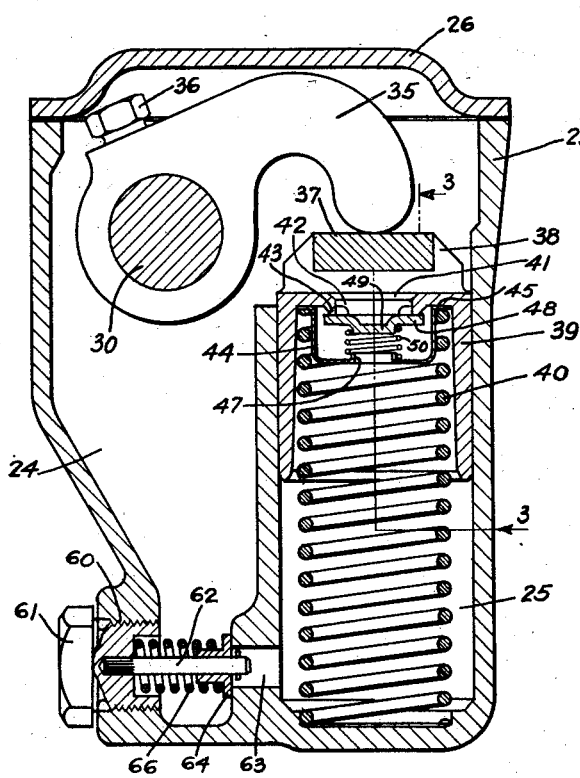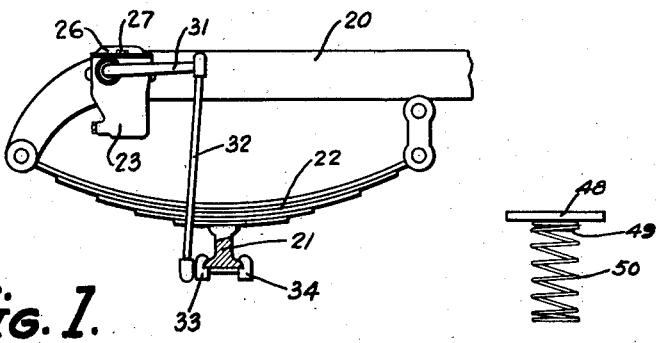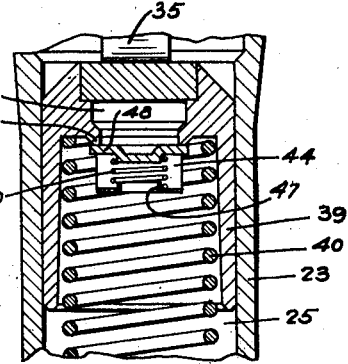

UNITED STATES PATENT OFFICE

WILLIAM A. CHRYST, OF DAYTON, OHIO, ASSIGNOR TO DELCO PRODUCTS CORPORATION, OF DAYTON, OHIO, A CORPORATION OF DELAWARE

SHOCK ABSORBER

Application filed August 30, 1929. Serial No. 389,538.

This invention relates to improvements in hydraulic shock absorbers adapted to control the rebounding action of vehicle springs.

It is among the objects of the present invention to provide a shock absorber of simple structure and design adapted to be produced commercially at a minimum cost of time and material.

Another object of the present invention is to provide a hydraulic shock absorber with a valve supported so that it will be self-aligning and that sticking thereof will be substantially eliminated.

Further objects and advantages of the present invention will be apparent from the following description, reference being had to the accompanying drawings, where in a preferred embodiment of one form of the present invention is clearly shown.

In the drawings:

Fig. 1 is a fragmentary side view of the chassis of a motor vehicle having a shock absorber embodying the present invention attached thereto.

Fig. 2 is a longitudinal sectional view taken through the shock absorber.

Fig. 3 is a fragmentary detail sectional view taken along the line 3—3 of Fig. 2.

Figs. 4 and 5 are detail views showing portions of the valve assembly.

Referring to the drawings, the numeral 20 designates the frame of the vehicle which is supported upon the vehicle axle 21 by springs 22, only one of which is shown.

The shock absorber comprises a casing 23 presenting a fluid reservoir 24 and a cylinder 25. The open end of the casing 23 is sealed by the cover 26 secured to the casing by screws 27. The shock absorber casing is attached to the frame 20 in any suitable manner.

Bearing surfaces provided in the casing 23 rotatably support the rocker shaft 30, one end of which extends to the outside of the casing 23 and has the shock absorber operating arm 31 provided thereon. The free end of the arm 31 is secured to one end of a link connection 32, the other end of said link being attached to the bracket 33 anchored to the axle 21 by clamping member 34. Within the casing 23 and mounted upon the shaft 30 there is a rocker arm 35 secured to the shaft by the set screw 36. The free end of the rocker arm 35 engages with a wear piece 37 inserted in the head 38 of the piston 39. Piston 39 is reciprocably supported within the cylinder 25, a spring 40, interposed between the piston and the bottom end wall of the cylinder 25, urging the piston so that its wear piece 37 is substantially in constant engagement with the free end of the rocker arm 35.

In the piston head there is provided a passage 41 through which fluid may flow from the fluid reservoir 24 into the cylinder 25, as will be described. Around the annular opening 42 of passage 41 there is formed a ridge 43 providing a valve-seat on the inner surface of the piston head. A retaining member or cup 44, has an outwardly extending annular flange 45, which is engaged by spring 40 and is maintained against the inner piston head surface. Retainer cup or member 44 has an opening substantially coaxial of the cylinder 25, said opening having an annular flange 47. A disc valve 48 has a central annular extension 49. The convolutions at one end of the spring 50 fit grippingly about the central extension 49 of the valve 48, the convolutions at the other end of the spring fitting tightly about the annular flange 47 of the retaining member 44. Valve 48 is thus supported upon the retainer cup or member 44 in a wobbly manner, that is, it is not supported upon any stationary member, but upon the flexible spring which is carried by the retaining cup or member 44, whereby said valve will be self-aligning when it is urged into engagement with the valve seat 43 by the spring 50.

In the casing there is provided an aperture 60 screw-threaded for receiving the screw plug 61, which seals this opening. Screw plug 61 carries a valve pin 62 which extends into the port 63 in the cylinder wall and which provides communication between the fluid reservoir 24 and the cylinder 25. A valve 64 is slidably supported upon the pin 62 and is urged into engagement with the partition 65 to close the port 63 by a spring 66 surrounding pin 62 and interposed between the valve and the screw plug 61.

When the road wheels of the vehicle, not shown, but mounted upon the axle 21, strike an obstruction in the roadway, springs 22 will be flexed, moving upwardly toward the frame 20, thus causing counter-clockwise rotation of the arm 31 and its shaft 30 and thus moving the rocker arm 35 away from the piston 39. Spring 40, however, will cause the piston to follow the upward movement of the free end of rocker arm 35 and thus fluid within the fluid reservoir 34, exerting pressure upon the valve 48, will cause said valve to be moved from the valve seat 43 against the effect of spring 50 and thus a flow of fluid will be established from the reservoir through the passage 41, past the valve 48 into the cylinder 25.

Return movement of the spring toward unflexed position will, if not controlled, be of a rebounding nature, resulting in undesirable jars and jolts being transmitted to the frame of the vehicle. To avoid this, the present device resists the movement of the spring as it unflexes. As the springs 22 move toward normal position, the link connection 32 will move the arm 31 and consequently the shaft 30 clockwise, this clockwise movement of the rocker arm 35 exerting a pressure upon the piston, causing it to be moved downwardly into its cylinder and thus a pressure is exerted upon the fluid within said cylinder. When this pressure reaches a predetermined value, it will move the valve 64 from engagement with the partition 65 and thus will be established a restricted flow of fluid from the cylinder 25, through the port 63, past the valve 64 into the fluid reservoir 24, this restriction resisting the movement of the piston 39 downwardly and thus resisting the tendency of the spring 22 to return to normal position with rebounding movement.

The construction of the intake valve provided in the piston substantially eliminates leakage at this point, said leakage generally being caused by sticking of the valve or improper seating thereof on the valve-seat due to improperly positioned valve pins. The present valve structure provides a wobbly valve not mounted upon a pin, thus sticking is entirely eliminated and full seating of the valve upon the valve seat is substantially assured.

While the form of embodiment of the present invention as herein disclosed, constitutes a preferred form, it is to be understood that other forms might be adopted, all coming within the scope of the claims which follow.

What is claimed is as follows:

1. A shock absorber comprising, in combination, a casing presenting a fluid reservoir and a cylinder; a piston in the cylinder forming a compression chamber therein; means for operating the piston on its suction stroke; a passage in the piston providing for the transfer of fluid from one side of the piston to the other as said piston moves through its suction stroke; a valve cage maintained upon the piston by the piston operating means; a spring secured at one end to the valve cage; and a valve solely supported upon the spring to which it is attached, said spring normally urging said valve to close the piston passage.

2. A shock absorber comprising in combination, a casing presenting a fluid reservoir and a cylinder; a piston in the cylinder forming a compression chamber therein; means for operating the piston through its suction stroke; a passage in the piston providing for the transfer of fluid from one side of the piston to the other as said piston is moved through its suction stroke; a disc valve having a central protuberance; a valve cage having a central flange substantially coaxial of the protuberance of the disc-valve, said valve cage being maintained upon the piston by the said piston operating means; and a spring secured at one end to the valve protuberance and at the other end to the valve-cage flange, said spring providing the sole support of the value and urging the valve to close the passage in the piston.

3. A shock absorber comprising in combination, a casing presenting a fluid reservoir and a cylinder; a piston in the cylinder forming a compression chamber therein, said piston having a head portion provided with a passage therethrough; an annular ridge about said passage providing a valve seat; levers for operating the piston in one direction; a spring for operating the piston in the other direction; a disc-valve having a central, annular extension away from the valve seat; a retainer cup maintained upon the piston by the piston operating spring, said retainer cup having an annular flange extending toward the disc-valve; and a spring having the convolutions adjacent one end grippingly fitting about the annular extension on the disc-valve and the convolutions adjacent the other end grippingly fitting about the annular flange on the retainer cup and urging the valve upon the valve-seat.

4. A shock absorber comprising in combination, a casing presenting a fluid reservoir and a cylinder; a piston in the cylinder forming a compression chamber therein, said piston having a head portion provided with a passage therethrough; an integral annular ridge on the piston, about said passage providing a valve seat; levers for operating the piston in one direction; a spring for operating the piston in the other direction; a disc-valve; a retainer cup maintained upon the piston by its operating spring; and resilient means anchored at one end to the retainer cup, and at the other end to the disc valve so as to secure the valve and valve cage together as a unitary structure, said spring yieldably supporting the valve within the valve cage and urging it into engagement with the valve-seat.

In testimony whereof I hereto affix my signature.

WILLIAM A. CHRYST.